United States Patent
Kuo

(10) Patent No.: US 9,105,971 B2
(45) Date of Patent: Aug. 11, 2015

(54) SINGLE EXTERNAL ANTENNA FOR FM PHASE DIVERSITY FOR A VEHICLE RADIO UNIT

(71) Applicant: Visteon Global Technologies, Inc., Van Buren Township, MI (US)

(72) Inventor: Yao H. Kuo, West Bloomfield, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 13/713,638

(22) Filed: Dec. 13, 2012

(65) Prior Publication Data

US 2014/0171000 A1    Jun. 19, 2014

(51) Int. Cl.
| | |
|---|---|
| H04B 1/38 | (2006.01) |
| H01Q 1/32 | (2006.01) |
| H04B 7/08 | (2006.01) |
| H01Q 3/26 | (2006.01) |

(52) U.S. Cl.
CPC ............ *H01Q 1/3208* (2013.01); *H01Q 1/3275* (2013.01); *H01Q 3/26* (2013.01); *H04B 7/0848* (2013.01)

(58) Field of Classification Search
CPC ........... H04B 1/06; H04B 7/08; H04B 7/0825
USPC ............. 455/569.2, 562.1, 575.1, 566, 575.9, 455/101, 575.7, 130, 269, 272, 344, 345, 455/178.1, 180.1
See application file for complete search history.

(56) References Cited

U.S. PATENT DOCUMENTS

| | | | |
|---|---|---|---|
| 4,352,111 A | | 9/1982 | Carlson et al. |
| 5,673,323 A | * | 9/1997 | Schotz et al. ............. 381/2 |
| 6,236,844 B1 | * | 5/2001 | Cvetkovic et al. ............ 455/273 |
| 7,447,284 B2 | * | 11/2008 | Raj et al. ....................... 375/346 |
| 7,535,426 B2 | | 5/2009 | Burnham et al. |
| 8,019,027 B2 | | 9/2011 | Mada |
| 8,131,235 B2 | | 3/2012 | Becker et al. |
| 2004/0003399 A1 | | 1/2004 | Cooper |
| 2005/0107030 A1 | * | 5/2005 | Zafar et al. ................... 455/3.02 |
| 2006/0094379 A1 | * | 5/2006 | Gamo ........................... 455/137 |
| 2008/0246672 A1 | * | 10/2008 | Sliskovic et al. ............. 343/713 |
| 2009/0318104 A1 | * | 12/2009 | Asada et al. .................. 455/296 |
| 2009/0322596 A1 | * | 12/2009 | Rowitch et al. ............ 342/357.1 |
| 2010/0166122 A1 | | 7/2010 | Pahuja et al. |
| 2010/0207837 A1 | * | 8/2010 | Minard et al. ................ 343/794 |
| 2013/0076577 A1 | * | 3/2013 | Chakam et al. ............... 343/713 |
| 2013/0176231 A1 | * | 7/2013 | Chen ............................. 345/173 |

OTHER PUBLICATIONS

Shatara, Raed S., "Combined Switched and Phase Aligned Multi-Antenna Diversity System for Signal-Error-Reduction", Universitat der Bundeswehr Munchen, 127 pages, published at least as early as Aug. 27, 2012.

* cited by examiner

*Primary Examiner* — Tuan Pham
(74) *Attorney, Agent, or Firm* — Klintworth & Rozenblat IP LLC

(57) ABSTRACT

Systems, apparatuses and methods for providing FM phase diversity capabilities are provide. In some aspects, a vehicle system includes a first FM antenna positioned externally of a vehicle and adapted to receive a first FM signal, a radio unit positioned internally of the vehicle and including a display and at least one user control, a cable electrically coupled to the first FM antenna and the radio unit to communicate the first FM signal to the radio unit, and a second FM antenna positioned internally of the vehicle and adapted to receive a second FM signal that is communicated to the radio unit. In another aspect, a radio unit positioned internally of the vehicle may include a printed wire board and a second FM antenna may be positioned on the printed wire board internally of the vehicle and adapted to receive a second FM signal.

18 Claims, 4 Drawing Sheets

SINGLE EXTERNAL ANTENNA FOR FM PHASE DIVERSITY FOR A VEHICLE RADIO UNIT

FIELD OF THE DISCLOSURE

This disclosure generally relates to FM phase diversity for a vehicle radio unit and, more particularly, to apparatuses, systems, and methods for providing FM phase diversity with a single external antenna for a vehicle radio unit.

BACKGROUND

Vehicles attempting to have FM phase diversity capabilities require at least two FM antennas external of the vehicle cabin to bring FM signals into the vehicle radio unit positioned internal of the vehicle cabin. Exemplary external locations for FM antennas include a roof of the vehicle, the rearview mirrors, etc. Other vehicles without FM phase diversity capabilities include only a single FM antenna in the entire vehicle and such single FM antenna is external of the vehicle cabin to bring the FM signal into the vehicle radio unit. Vehicles with FM phase diversity capabilities may have significant improvements in FM reception and performance over vehicles without FM phase diversity capabilities. Such improvements may eliminate multi-path noise, weak signals, adjacent channel interference, and stronger signal overload distortion. Unfortunately, components required to achieve the FM phase diversity with at least two external FM antennas is expensive, thereby inhibiting vehicle manufacturers from implement FM phase diversity capabilities on high volume and/or low priced vehicles. Additionally, FM phase diversity can add cost on assembly and be a source of reliability issues for vehicle manufacturers.

Apparatuses, systems, and methods are needed to overcome one or more issues of one or more of the prior systems and methods.

SUMMARY

In one aspect, a vehicle system is provided and includes a first FM antenna positioned externally of a vehicle and adapted to receive a first FM signal, a radio unit positioned internally of the vehicle and including a display and at least one user control, a cable electrically coupled to the first FM antenna and the radio unit to communicate the first FM signal to the radio unit, and a second FM antenna positioned internally of the vehicle and adapted to receive a second FM signal that is communicated to the radio unit.

In another aspect, an FM phase diversity radio system for a vehicle is provided. The system includes a first FM antenna positioned externally of a vehicle and adapted to receive a first FM signal and a radio unit positioned internally of the vehicle. The radio unit includes a housing, a printed wire board coupled to the housing, a display electrically coupled to the printed wire board, at least one user control supported by the housing, and a second FM antenna positioned on the printed wire board internally of the vehicle and adapted to receive a second FM signal. The system further includes a cable electrically coupled to the first FM antenna and the radio unit to communicate the first FM signal to the radio unit.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
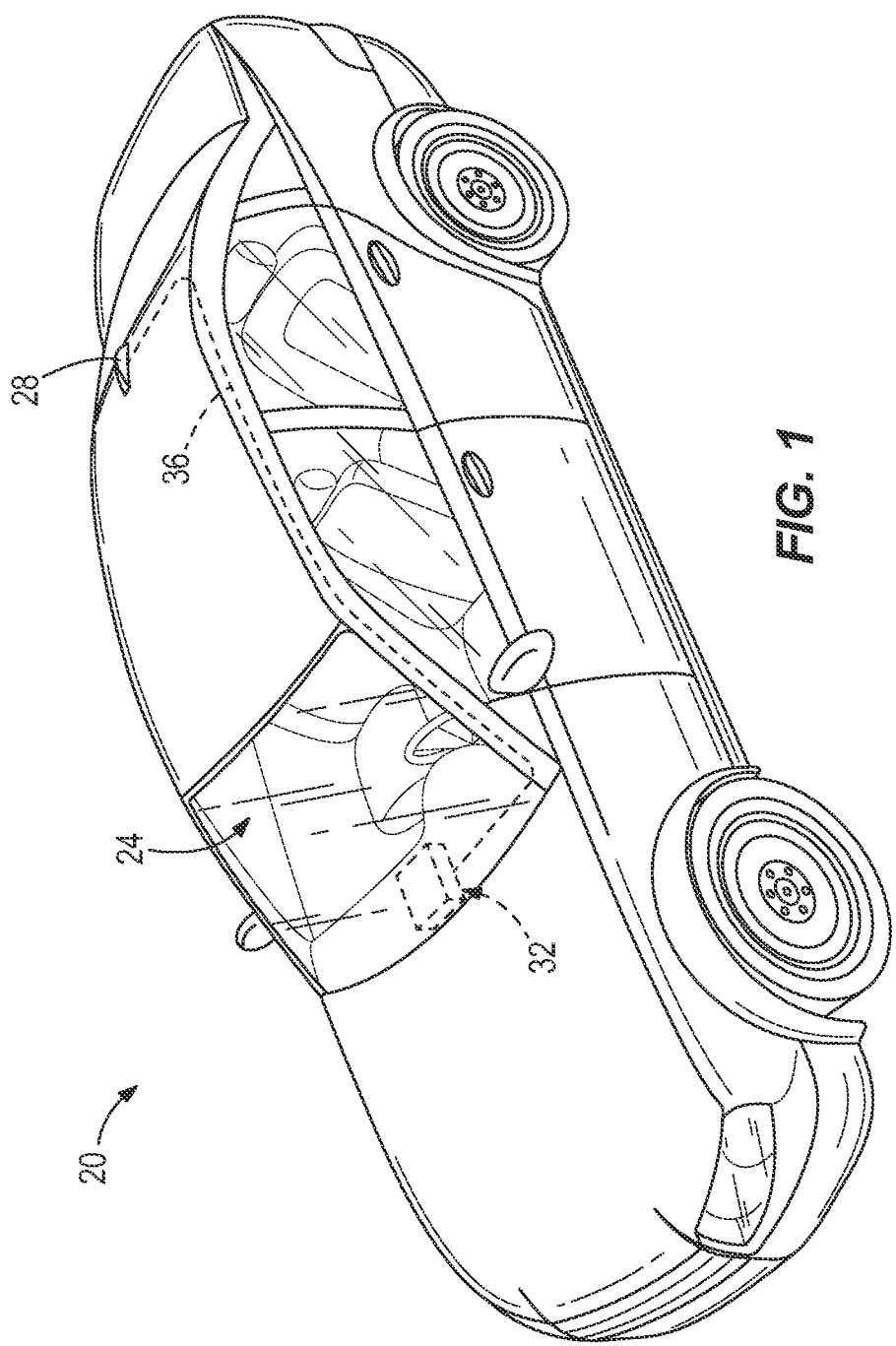
FIG. 1 is an exemplary environment or system, such as a vehicle, in which principles of the disclosure may be implemented, the exemplary vehicle illustrates an exemplary external antenna and an exemplary radio unit, in accordance with one embodiment.

With reference to FIG. 1, an exemplary environment or system 20 is illustrated in which principles of the disclosure may be implemented. The system 20 has FM phase diversity capabilities and is adapted to provide improved FM reception and performance over systems without FM phase diversity capabilities. Moreover, the system 20 is adapted to provide a less expensive option to achieve FM phase diversity capabilities. In the illustrated exemplary embodiment, the system is a vehicle 20. The illustrated vehicle 20 is only an exemplary vehicle and is not intended to be limiting. Rather, any type of vehicle may include the principles of the disclosure.

The exemplary vehicle 20 includes a cabin 24 where passengers sit during operation of the vehicle 20, an external antenna 28 positioned externally of the cabin 24, a radio unit 32 positioned internally of the cabin 24, and a cable 36 electrically coupled between the external antenna 28 and the radio unit 32 to communicate a signal received by the external antenna 28 to the radio unit 32. In the illustrated exemplary embodiment, the external antenna 28 is positioned on a roof of the vehicle 20. Alternatively, the external antenna 28 may be positioned externally of the cabin 24 at other locations on the vehicle 20 such as, for example, the rear view mirrors, a top surface of the trunk, any of the windows, etc. While the external antenna 28 may be any type of antenna adapted to receive any type of signal, in some exemplary embodiments, the external antenna 28 is an FM antenna adapted to receive FM signals.

Figure 2:
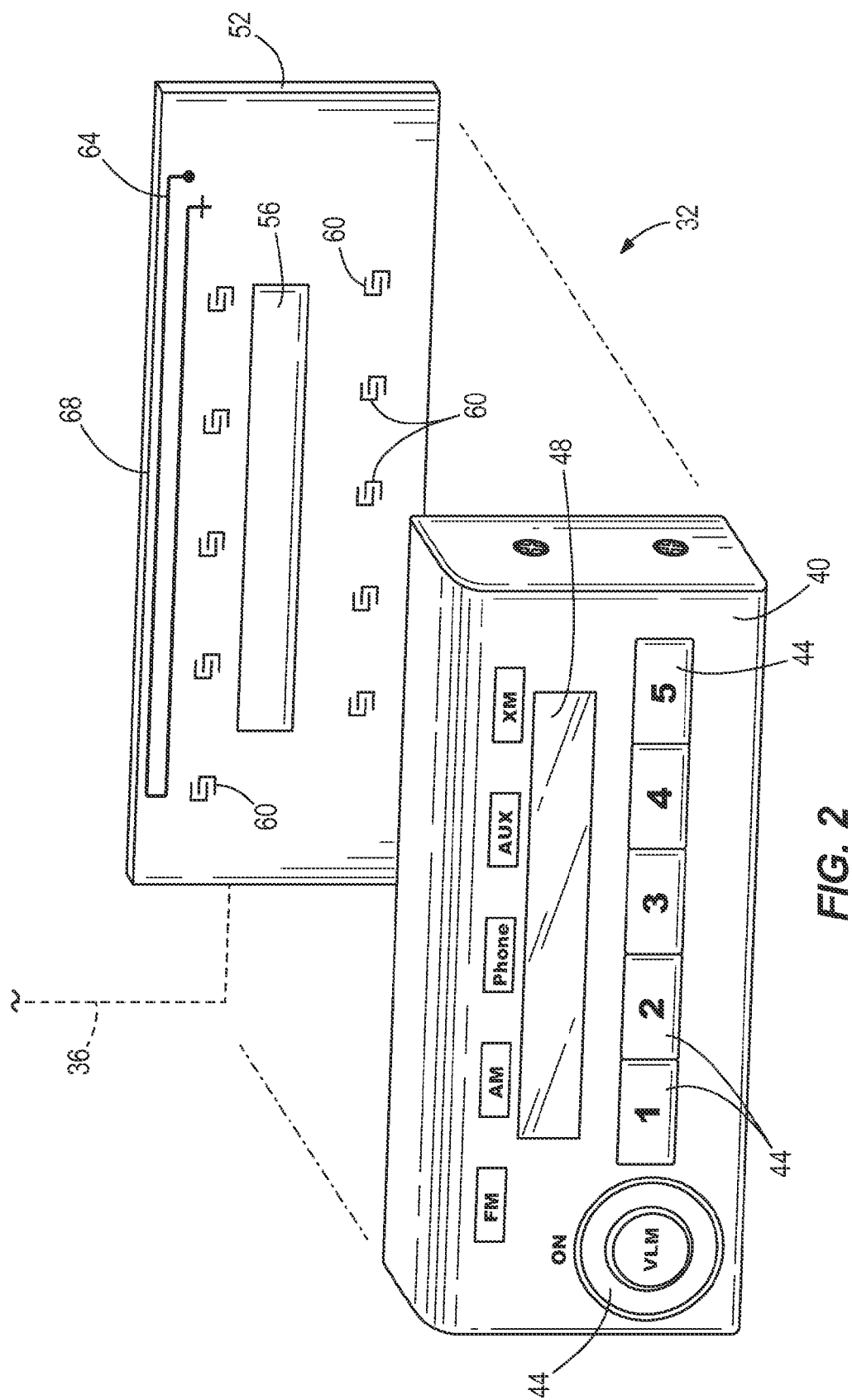
FIG. 2 is a partially exploded view of an exemplary radio unit of the system illustrated in FIG. 1, in accordance with one embodiment.

Referring now to FIG. 2, an exemplary radio unit 32 is illustrated. Any type and configuration of radio unit 32 may be included in the system 20 and the illustrated exemplary embodiment is merely to demonstrate the principles of the disclosure and is not intended to be limiting. The exemplary radio unit 32 includes a housing 40, a plurality of user controls 44 (which may be mechanical, electrical or a combination of mechanical and electrical controls) supported by the housing 40, a transparent or translucent display window 48 on the housing 40, and a printed wire board or printed circuit board 52 coupled to the housing 40. The radio unit 32 is adapted to include a wide range of functionality such as, for example, AM radio operation, FM radio operation, satellite radio operation, media audio operation (e.g., media includes, for example, CD, MP3, communication port coupled to external audio player such as a portable electronic communication device), etc. As a result, the printed wire board 52 includes all of the necessary electronics, components, circuitry, and software and/or algorithms to establish all the possible functionality of the radio unit 32. Some of the exemplary components on the printed wire board 52 include a display 56 aligned with the display window 48 on the housing 40 and switches or contacts 60 aligned with the user controls 44 on the housing 40.

As indicated above, the system 20 has FM phase diversity capabilities. Accordingly, the printed wire board 52 is coupled to the cable 36, which communicates the signal received from the external antenna 28, and includes an internal antenna 64 thereon. Similarly to the external antenna 28, the internal antenna 64 may be any type of antenna adapted to receive any type of signal. In some exemplary embodiments, the internal antenna 64 is an FM antenna adapted to receive FM signals. In the illustrated exemplary embodiment, the internal antenna 64 is positioned near an upper edge 68 of the printed wire board 52 with minimum shielding by radio conductive material. Alternatively, the internal antenna 64 may be located anywhere on the printed wire board 52.

Figure 3:
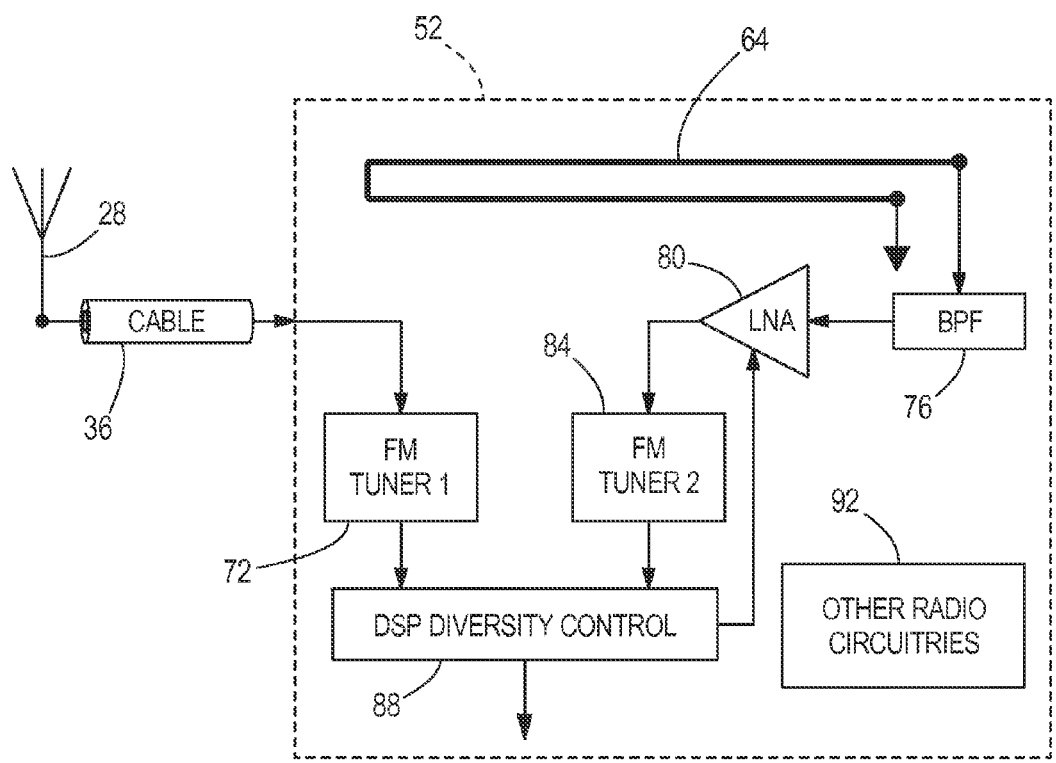
FIG. 3 is an exemplary diagram of a portion of the system illustrated in FIG. 1, in accordance with one embodiment.

With reference now to FIG. 3, an exemplary diagram illustrating a portion of the system 20 is illustrated. This exemplary diagram includes the external antenna 28, the printed wire board 52, and the cable 36 electronically coupled to the external antenna 28 and the printed wire board 52 to communicate the signal from the external antenna 28 to the printed wire board 52. In this exemplary diagram, the printed wire board 52 includes a first FM tuner 72 electrically coupled to the external antenna cable 36, the internal antenna 64, a band pass filter (BPF) 76 electronically coupled to the internal antenna 64, a low noise amplifier (LNA) 80, a second FM tuner 84, a digital signal processor (DSP) diversity control 88, and other radio unit circuitries 92 (e.g., AM radio components and circuitry, satellite radio components and circuitry, etc.). The signal from the external antenna 28 is communicated to the first FM tuner 72 through the cable 36 and then is sent to the DSP diversity control 88, which includes the necessary processor(s), memory, components, control firmware, software, etc., to achieve the desired operation of the radio unit 32 including FM phase diversity capabilities. The signal received from the internal antenna 64 is communicated to the BPF 76, then to the LNA 80 and the second FM tuner 84. In some instances, the internal antenna 64 may receive a signal with a lower gain than the external antenna 28. The BPF 76 and LNA 80 are adapted to increase the gain to a desired level and then communicate the signal to the second FM tuner 84. Moreover, the LNA's 80 gain may be controlled by the DSP diversity control 88 to optimize the FM reception performance. After the second FM tuner 84, the signal is communicated to the DSP diversity control 88 for processing.

Figure 4:
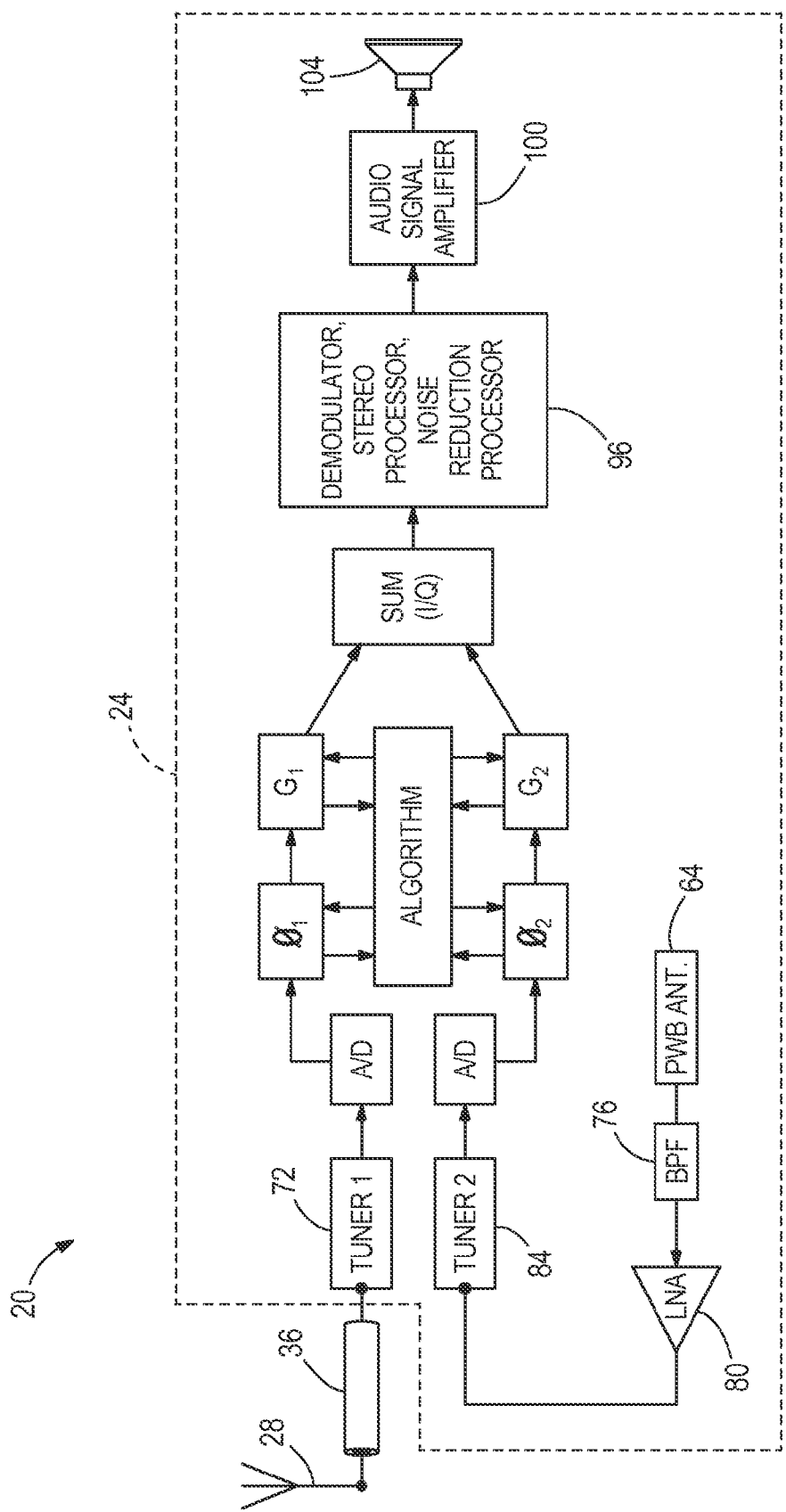
FIG. 4 is another diagram of a portion of the system illustrated in FIG. 1, in accordance with one embodiment.

FIG. 4 is another exemplary diagram of the system 20. The system 20 includes the external antenna 28, the cable 36 coupled between the external antenna 28 and the first tuner 72, and the components of the printed wire board 52. The external signal is communicated to the first tuner 72 and the internal signal is communicated to the second tuner 84. The first and second signals are then communicated downstream through various components and algorithm(s) for processing to achieve FM phase diversity and provide a sum signal from the internal and external signals. The sum signal is then communicated through a demodulator, Stereo processor, and a noise reduction processor 96 (all represented as single element in FIG. 4 for simplicity, but may each be individual components represented with their own elements). Then the sum signal is communicated to an audio signal amplifier 100 and ultimately to a speaker or other audio output device 104.

One or more embodiments of the disclosure may reduce one or more issues experienced by one or more current systems or methods by providing FM phase diversity capabilities with a single external antenna and a single internal antenna as opposed to a more expensive and complicated system including two or more external antennas and associated components (cables, etc.). One or more embodiments of the disclosure may also have additional benefits over one or more other existing systems and methods.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the disclosure is defined by the appended claims. Accordingly, the disclosure is not to be restricted except in light of the appended claims and their equivalents.

The invention claimed is:

1. A vehicle system comprising:
   a first FM antenna positioned externally of a vehicle and configured to receive a first FM signal;
   a radio unit positioned internally of the vehicle and including a display and at least one user control;
   a cable electrically coupled to the first FM antenna and the radio unit to communicate the first FM signal to the radio unit;
   a second FM antenna positioned internally of the vehicle and configured to receive a second FM signal that is communicated to the radio unit; and
   a FM diversity control connected to the first antenna and the second antenna which is configured to achieve FM phase diversity to provide a sum signal from the first FM signal and the second FM signal,
   wherein the FM diversity control is configured to transmit the sum signal to a demodulator, to a stereo processor, to a noise reduction processor, to an audio signal amplifier, and to an audio output device.

2. The vehicle system of claim 1, wherein the second FM antenna is positioned in the radio unit.

3. The vehicle system of claim 1, wherein the radio unit includes a printed wire board and wherein the second FM antenna is positioned on the printed wire board.

4. The vehicle system of claim 3, wherein the second FM antenna is positioned proximate an edge of the printed wire board.

5. The vehicle system of claim 4, wherein the second FM antenna is positioned proximate an upper edge of the printed wire board.

6. The vehicle system of claim 1, further comprising a band pass filter and a low noise amplifier, and wherein the second FM antenna is configured to transmit the second FM signal to the band pass filter and the low noise amplifier.

7. The vehicle system of claim 6, wherein the second FM antenna is configured to transmit the second FM signal directly to the band pass filter, and then the band pass filter is configured to transmit the second FM signal directly to the low noise amplifier.

8. The vehicle system of claim 7, wherein the radio unit further includes a first FM tuner configured to receive the first FM signal directly from the first antenna, and a second FM tuner configured to receive the second FM signal directly from the low noise amplifier.

9. The vehicle system of claim 8, wherein the first FM tuner is configured to transmit the first FM signal directly to the FM diversity control, and the second FM tuner is configured to transmit the second FM signal directly to the FM diversity control.

10. The vehicle system of claim 6, wherein the radio unit includes a printed wire board, and wherein the second FM antenna, the band pass filter, and the low noise amplifier are positioned on the printed wire board.

11. The vehicle system of claim 1, wherein the vehicle includes a cabin configured to be occupied by a passenger, and wherein the first FM antenna is positioned externally of the cabin and the second FM antenna is positioned in the cabin.

12. An FM phase diversity radio system for a vehicle, the system comprising:
 a first FM antenna positioned externally of a vehicle and configured to receive a first FM signal;
 a radio unit positioned internally of the vehicle, the radio unit including
  a housing,
  a printed wire board coupled to the housing,
  a display electrically coupled to the printed wire board,
  at least one user control supported by the housing, and
  a second FM antenna positioned on the printed wire board internally of the vehicle and configured to receive a second FM signal;
 a cable electrically coupled to the first FM antenna and the radio unit and configured to communicate the first FM signal to the radio unit; and
 a FM diversity control connected to the first antenna and the second antenna which is configured to achieve FM phase diversity to provide a sum signal from the first FM signal and the second FM signal,
 wherein the FM diversity control is configured to transmit the sum signal to a demodulator, to a stereo processor, to a noise reduction processor, to an audio signal amplifier, and to an audio output device.

13. The FM phase diversity radio system of claim 12, wherein the second FM antenna is positioned proximate an edge of the printed wire board.

14. The FM phase diversity radio system of claim 13, wherein the second FM antenna is positioned proximate an upper edge of the printed wire board.

15. The FM phase diversity radio system of claim 12, wherein the radio unit further includes a band pass filter and a low noise amplifier positioned on the printed wire board, and wherein the second FM signal is configured to transmit the second FM signal directly to the band pass filter, and then the band pass filter is configured to transmit the second FM signal directly to the low noise amplifier.

16. The FM phase diversity radio system of claim 15, wherein the radio unit further includes a first FM tuner configured to receive the first FM signal directly from the first antenna, and a second FM tuner configured to receive the second FM signal directly from the low noise amplifier.

17. The FM phase diversity radio system of claim 16, wherein the first FM tuner is configured to transmit the first FM signal directly to the FM diversity control, and the second FM tuner is configured to transmit the second FM signal directly to the FM diversity control.

18. The FM phase diversity radio system of claim 12, wherein the vehicle includes a cabin adapted to be occupied by a passenger, and wherein the first FM antenna is positioned externally of the cabin and the second FM antenna is positioned in the cabin.

* * * * *